(12) United States Patent
Onohara et al.

(10) Patent No.: US 11,039,378 B2
(45) Date of Patent: Jun. 15, 2021

(54) INFORMATION PROCESSING METHOD AND INFORMATION PROCESSING SYSTEM

(71) Applicant: SONY CORPORATION, Tokyo (JP)

(72) Inventors: Takashi Onohara, Tokyo (JP); Taichi Yoshio, Kanagawa (JP); Takuma Higo, Tokyo (JP); Hiroshi Tamaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/781,363

(22) PCT Filed: Nov. 15, 2016

(86) PCT No.: PCT/JP2016/004881
§ 371 (c)(1),
(2) Date: Jun. 4, 2018

(87) PCT Pub. No.: WO2017/110035
PCT Pub. Date: Jun. 29, 2017

(65) Prior Publication Data
US 2018/0324684 A1 Nov. 8, 2018

(30) Foreign Application Priority Data
Dec. 24, 2015 (JP) .............................. JP2015-251475

(51) Int. Cl.
*H04W 48/16* (2009.01)
*H04W 76/10* (2018.01)
(Continued)

(52) U.S. Cl.
CPC ............... *H04W 48/16* (2013.01); *G01S 1/02* (2013.01); *G10K 15/02* (2013.01);
(Continued)

(58) Field of Classification Search
CPC ....... H04W 48/08; H04W 48/16; H04W 4/02; H04W 4/80; H04W 64/003
See application file for complete search history.

(56) References Cited

U.S. PATENT DOCUMENTS 9,075,979 B1 * 7/2015 Queru ..................... G06F 21/34
2008/0287062 A1 * 11/2008 Claus ................... H04W 12/06
455/41.2

(Continued)

FOREIGN PATENT DOCUMENTS

CN 102917438 A 2/2013
JP 2013-038498 A 2/2013
(Continued)

OTHER PUBLICATIONS

International Search Report and Written Opinion of PCT Application No. PCT/JP2016/004881, dated Feb. 14, 2017, 06 pages of ISRWO.

(Continued)

*Primary Examiner* — Jamal Javaid
*Assistant Examiner* — Ryan C Kavleski
(74) *Attorney, Agent, or Firm* — Chip Law Group

(57) ABSTRACT

An information processing method according to an embodiment of the present technology which is executed by a computer includes detecting, on a basis of a beacon signal transmitted from a first apparatus, the first apparatus, and communicably connecting the detected first apparatus and the computer. A distance from the computer to the first apparatus is calculated on a basis of an intensity of a signal received from the first apparatus communicably connected. In a case where the calculated distance is equal to or less than a predetermined threshold value, setting information for communicably connecting the first apparatus and a second apparatus is transmitted to the first apparatus.

11 Claims, 7 Drawing Sheets

(51) Int. Cl.
*H04M 11/00* (2006.01)
*H04N 21/4363* (2011.01)
*H04R 3/12* (2006.01)
*H04W 84/12* (2009.01)
*H04M 1/00* (2006.01)
*H04W 84/10* (2009.01)
*G10K 15/02* (2006.01)
*H04W 4/80* (2018.01)
*G01S 1/02* (2010.01)
*H04L 12/28* (2006.01)
*H04W 4/02* (2018.01)
*H04W 48/04* (2009.01)
*H04W 48/08* (2009.01)
*H04W 64/00* (2009.01)

(52) U.S. Cl.
CPC .......... *H04L 12/2807* (2013.01); *H04M 1/00* (2013.01); *H04M 11/00* (2013.01); *H04N 21/4363* (2013.01); *H04R 3/12* (2013.01); *H04W 4/02* (2013.01); *H04W 4/80* (2018.02); *H04W 48/04* (2013.01); *H04W 48/08* (2013.01); *H04W 64/003* (2013.01); *H04W 76/10* (2018.02); *H04W 84/10* (2013.01); *H04W 84/12* (2013.01)

(56) References Cited

U.S. PATENT DOCUMENTS

| | | | |
|---|---|---|---|
| 2013/0005256 A1* | 1/2013 | Koehler | H04W 8/26 455/41.2 |
| 2013/0034046 A1 | 2/2013 | Ishii et al. | |
| 2014/0286496 A1* | 9/2014 | Luna | H04R 29/001 381/59 |
| 2014/0364056 A1 | 12/2014 | Belk et al. | |
| 2016/0073162 A1* | 3/2016 | Cooperstein | H04N 21/25 725/114 |
| 2017/0041886 A1* | 2/2017 | Baker | H04W 16/28 |
| 2017/0067983 A1* | 3/2017 | Teicher | G07C 9/28 |
| 2017/0093848 A1* | 3/2017 | Poisner | A63F 13/235 |
| 2018/0102858 A1* | 4/2018 | Tiwari | H04L 67/18 |

FOREIGN PATENT DOCUMENTS

| | | |
|---|---|---|
| JP | 2014-527327 A | 10/2014 |
| JP | 2015-211298 A | 11/2015 |

OTHER PUBLICATIONS

Office Action for JP Patent Application No. 2017-557684 dated Jan. 5, 2021, 3 pages of Office Action and 3 pages of English Translation.

* cited by examiner

INFORMATION PROCESSING METHOD AND INFORMATION PROCESSING SYSTEM

CROSS REFERENCE TO RELATED APPLICATIONS

This application is a U.S. National Phase of International Patent Application No. PCT/JP2016/004881 filed on Nov. 15, 2016, which claims priority benefit of Japanese Patent Application No. JP 2015-251475 filed in the Japan Patent Office on Dec. 24, 2015. Each of the above-referenced applications is hereby incorporated herein by reference in its entirety.

TECHNICAL FIELD

The present technology relates to an information processing method, a program, and an information processing system capable of being applied to wireless connection or the like between a network-enabled apparatus and an access point, for example.

BACKGROUND ART

In related art, a system is known in which a content such as music and video is reproduced by a network-enabled audio apparatus or the like connected with a wireless network. For example, Patent Literature 1 discloses a network system provided with a portable apparatus, accessories including a speaker system and the like, and an access point as shown in FIG. 1 and FIG. 2 thereof (paragraphs [0016] to [0018] of specification of Patent Literature 1, for example).

In the network system described in Citation Literature 1, the portable apparatus and the accessories are connected physically in a wired manner or by wireless communication such as Bluetooth (registered trademark) and BLE (Bluetooth Low Energy). In the state, from the portable apparatus to the accessories, an SSID (Service Set Identifier), an access key, and the like for the wireless network are transmitted. The accessories use the received SSID and the like and thus can be connected with the wireless network managed by an access point (paragraphs [0011], [0020], [0022], or the like of specification of Patent Literature 1).

CITATION LIST

Patent Literature

Patent Literature 1: Japanese Patent Translation Publication No. 2014-527327

DISCLOSURE OF INVENTION

Technical Problem

For example, an assumption is made that a wireless network is constructed in home, and a plurality of audio apparatuses disposed in each room is connected. In this case, a technology capable of connecting the audio apparatuses are connected to an access point in the wireless network in a simple, safe manner is demanded.

In view of the circumstances as described above, an object of the present technology is to provide an information processing method, a program, and an information processing system that enable connection to an access point to be achieved simply and safely.

Solution to Problem

To achieve the object described above, an information processing method according to an embodiment of the present technology includes detecting, on a basis of a beacon signal transmitted from a first apparatus, the first apparatus, and communicably connecting the detected first apparatus and the computer.

A distance from the computer to the first apparatus is calculated on a basis of an intensity of a signal received from the first apparatus communicably connected.

In a case where the calculated distance is equal to or less than a predetermined threshold value, setting information for communicably connecting the first apparatus and a second apparatus is transmitted to the first apparatus.

In the information processing method, on a basis of the beacon signal transmitted from the first apparatus, the computer and the first apparatus are communicably connected. Thus, connection with the first apparatus can be achieved. Further, in a case where the distance to the first apparatus is equal to or less than the predetermined threshold value, to the first apparatus, the setting information for connecting with the second apparatus is transmitted. As a result, security can be enhanced. By applying the present technology to a network-enabled machine (first apparatus) and an access point (second apparatus), the connection to the access point can be performed simply and safely.

The calculating step may include transmitting a predetermined inquiry signal to the first apparatus and calculating the distance on a basis of an intensity of a response signal to the inquiry signal from the first apparatus.

As a result, it is possible to calculate the distance at a desired timing.

The calculating step may include calculating the distance on a basis of an intensity of the beacon signal received from the first apparatus.

As a result, it is possible to easily calculate the distance.

The information processing method may further include outputting guide information for guiding a user of the computer in such a manner that the distance from the computer to the first apparatus is equal to or less than the threshold value.

As a result, it is possible to easily connect the first and second apparatuses.

The information processing method may further include displaying the first apparatus detected on a basis of the beacon signal on a display unit of the computer. In this case, the connecting step may include connecting, in accordance with a selection operation by a user with respect to the first apparatus displayed on the display unit, the selected first apparatus and the computer.

As a result, it is possible to reliably select a first apparatus that is desired to be connected with the second apparatus, resulting in achieving high security.

The displaying step may include displaying state information relating to connection of the detected first apparatus with the second apparatus.

As a result, it is possible for the user to easily confirm a connection state of the detected first apparatus.

The displaying step may include displaying the distance from the computer to the detected first apparatus on the display unit.

As a result, it is possible for the user to intuitively grasp the detected first apparatus.

The connecting step may include connecting, on a basis of the beacon signal compliant with a BLE (Bluetooth Low Energy) standard, the first apparatus and the computer in such a manner that BLE communication is enabled. In this case, the transmitting step may include transmitting the setting information through the BLE communication.

The BLE communication makes it possible to achieve the connection without performing pairing, and thus the connection with the first apparatus can be easily achieved.

The second apparatus may be an access point that constructs a wireless network. In this case, the transmitting step may include transmitting the setting information including an SSID (Service Set Identifier) for identifying the access point and a password.

As a result, it is possible to perform the connection to the access point simply and safely.

The second apparatus may be the computer. In this case, the transmitting step may include transmitting the setting information including a Bluetooth (registered trademark) address and a pairing request.

As a result, it is possible to perform the Bluetooth pairing between the computer and the first apparatus simply and safely.

The first apparatus may be a reproduction apparatus capable of reproducing a content. In this case, the information processing method may further include transmitting an instruction to perform content reproduction to the reproduction apparatus via the wireless network.

By using the present technology, it is possible to construct the content reproduction system simply and safely.

The connecting step may include detecting a plurality of first apparatuses and connecting each of the plurality of detected first apparatuses and the computer. In this case, the transmitting step may include transmitting the setting information to each of the plurality of first apparatuses communicably connected, in a case where a distance to the computer is equal to or less than the threshold value.

As a result, it is possible to connect the plurality of first apparatuses to the second apparatus simply and safely.

A program according to an embodiment of the present technology causes a computer to execute the following steps.

A step of detecting, on a basis of a beacon signal transmitted from a first apparatus, the first apparatus, and communicably connecting the detected first apparatus and the computer.

A step of calculating a distance from the computer to the first apparatus on a basis of an intensity of a signal received from the first apparatus communicably connected.

A step of transmitting, in a case where the calculated distance is equal to or less than a predetermined threshold value, setting information for communicably connecting the first apparatus and a second apparatus to the first apparatus.

An information processing system according to an embodiment of the present technology includes a first apparatus, a second apparatus, and a computer.

The first apparatus outputs a beacon signal.

The computer includes a connection unit, a calculation unit, and a transmission unit.

The connection unit detects, on a basis of a beacon signal transmitted from the first apparatus, the first apparatus, and is communicably connected with the detected first apparatus.

The calculation unit calculates a distance to the first apparatus on a basis of an intensity of a signal received from the first apparatus communicably connected.

The transmission unit transmits, in a case where the calculated distance is equal to or less than a predetermined threshold value, setting information for communicably connecting the first apparatus and the second apparatus to the first apparatus.

Advantageous Effects of Invention

As described above, according to the present technology, it is possible to perform the connection to the access point simply and safely. It should be noted that the effects described herein are not necessarily limited, any effect described in this disclosure may be obtained.

MODE(S) FOR CARRYING OUT THE INVENTION

Hereinafter, embodiments according to the present technology will be described with reference to the drawings.

[Content Reproduction System]

Figure 1:
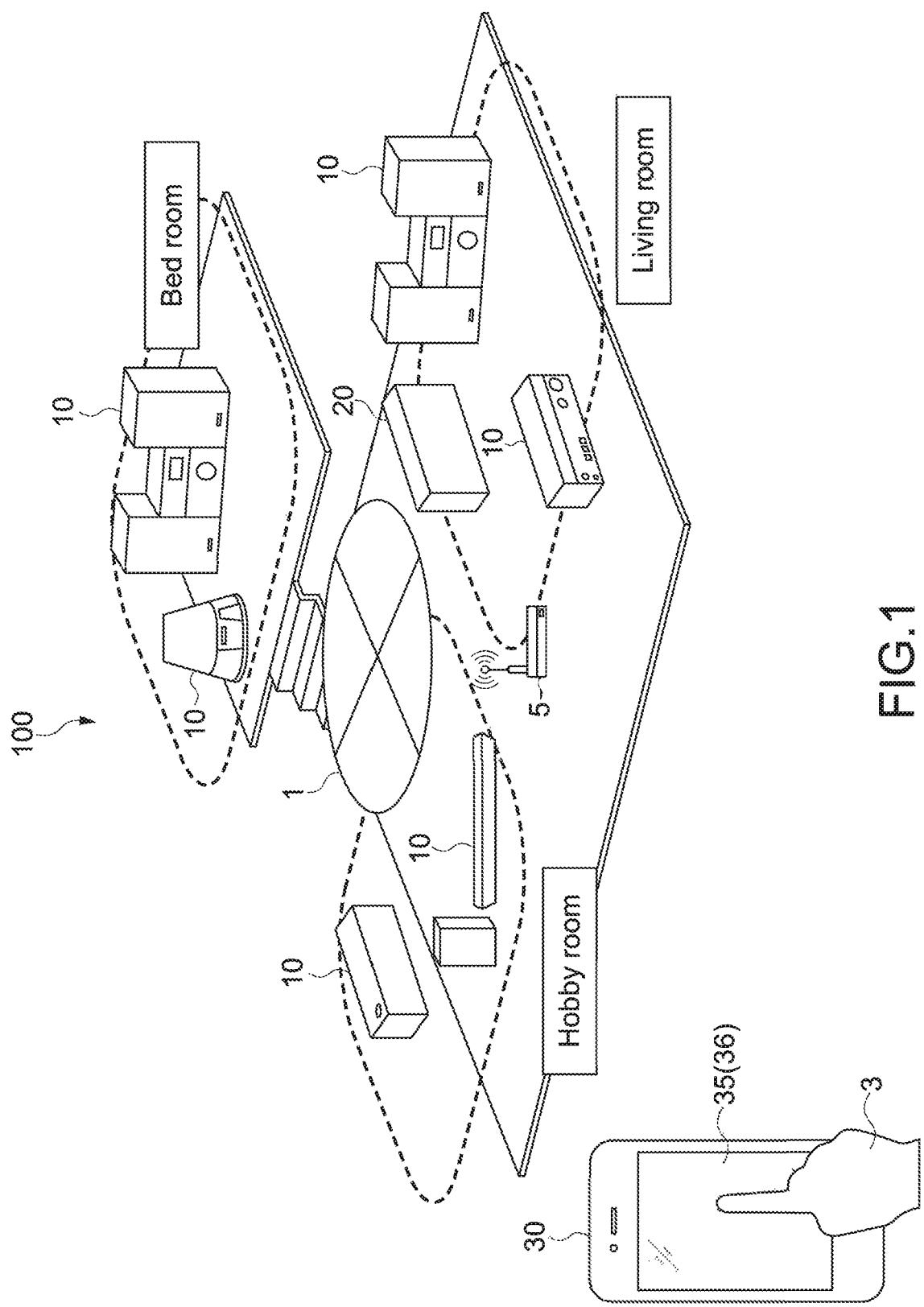
FIG. 1 A schematic diagram showing a configuration example of a content reproduction system according to an embodiment.

FIG. 1 is a schematic diagram showing a configuration example of a content reproduction system as an embodiment of an information processing system according to the present technology. A content reproduction system 100 includes a home network 1 constructed in home, a plurality of reproduction apparatuses 10 connected to this, a server apparatus 20 that provides a content, and a mobile terminal 30.

The plurality of reproduction apparatuses 10, the server apparatus 20, and the mobile terminal 30 are connected to the home network 1 through an access point 5 by wireless LAN communication such as WiFi. Thus, the access point 5 is one of devices that constitute the home network 1. As the home network 1, for example, a network that is compliant with a DLNA (Digital Living Network Alliance) standard.

In this case, the plurality of reproduction apparatuses 10 functions as a DMR (Digital Media Renderer), and the server apparatus 20 functions as a DMS (Digital Media Server). Further, the mobile terminal 30 functions as a DMC (Digital Media Controller). It should be noted that the present technology can be applied to a case where a network using another protocol is constructed.

As shown in FIG. 1, the plurality of reproduction apparatuses 10 is disposed in each of a living room, a hobby room, and a bed room. The mobile terminal 30 uses, for example, a control message or the like of a UPnP (Universal Plug and Play) to transmit, to the respective reproduction apparatuses 10, an instruction to obtain a content from the server apparatus 20 and reproduce the content.

Thus, a user 3 operates a mobile terminal 30, thereby making it possible to control a reproduction operation by the reproduction apparatuses 10 disposed in each room as appropriate. It should be noted that it is also possible to cause the reproduction apparatuses 10 to reproduce the content by using near field communication such as a global network and Bluetooth (registered trademark).

Further, in this embodiment, by operating the mobile terminal 30, it is possible to perform a setting operation to connect the reproduction apparatuses 10 to the home network 1 simply and safely. This point will be described in detail later.

In this embodiment, the plurality of reproduction apparatuses 10 reproduces a music content. However, the present technology can be applied to reproduction of various contents such as video in addition to the reproduction of the music content. Further, the number of reproduction apparatuses 10, the number of server apparatuses 20, and the like are not limited.

Examples of the reproduction apparatus 10 include various CE (Consumer Electronics) apparatuses such as a television set, a PC (Personal Computer), an audio/video receiver, a video monitor, and a home game machine. Further, an in-vehicle audio mounted on a vehicle or the like can be used as the reproduction apparatus according to the present technology.

As the server apparatus 20, for example, a PC, network-enabled HDD (NAS), or the like is used. As the mobile terminal 30, typically, a smart phone is used but is not limited to this. Various PDA (Personal Digital Assistant) such as a tablet terminal may be used therefor. In addition, various computers can be used as an information processing apparatus according to the present technology.

[Configuration of Mobile Terminal]

Figure 2:
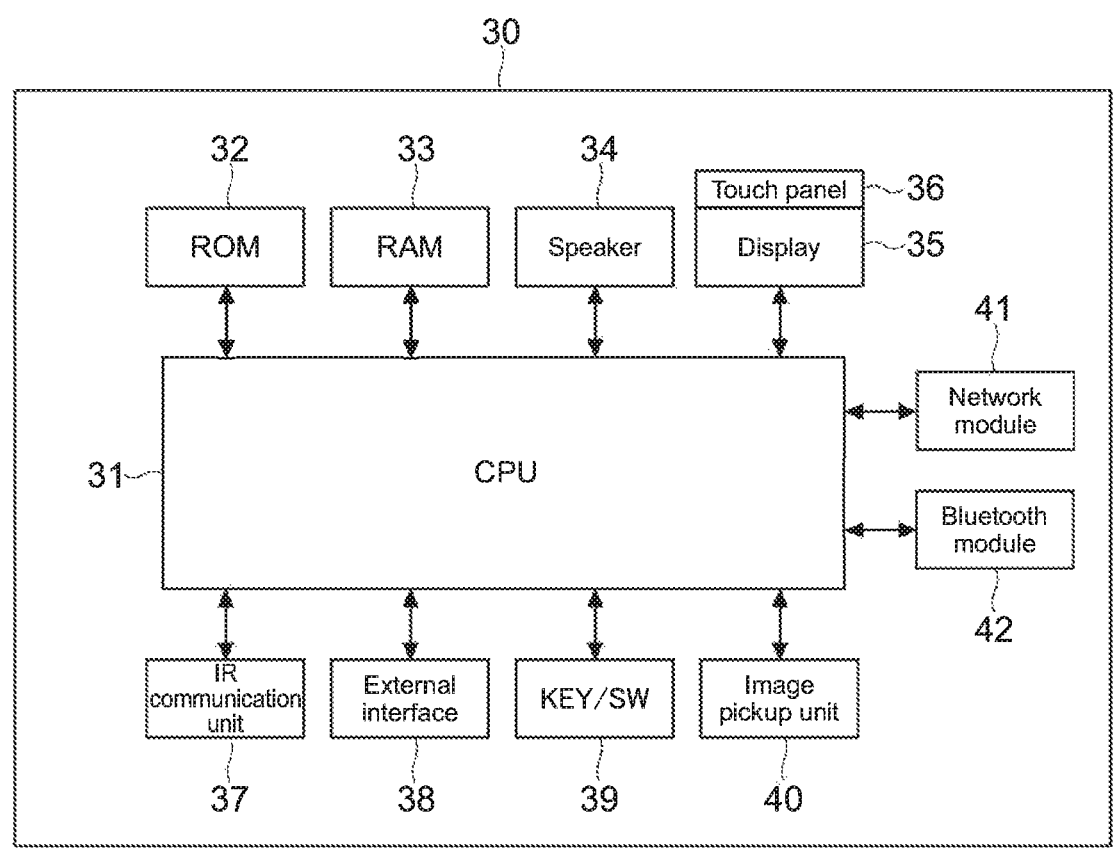
FIG. 2 A block diagram showing a configuration example of a mobile terminal.

FIG. 2 is a block diagram showing a configuration example of the mobile terminal 30. The mobile terminal 30 includes a CPU (Central Processing Unit) 31, a ROM (Read Only Memory) 32, a RAM (Random Access Memory) 33, a speaker 34, a display 35, and a touch panel 36. Further, the mobile terminal 30 includes an infrared (IR) communication unit 37, an external interface 38, a key/switch 39, and an image pickup unit 40. Furthermore, the mobile terminal 30 includes a network module 41 and a Bluetooth module 42.

The CPU 31 performs various computations by transmitting and receiving signals to and from blocks of the mobile terminal 30 and performs overall control for various processes to be executed in the mobile terminal 30, such as a reproduction instruction of a content to the reproduction apparatuses 10 and displaying of a GUI (Graphical User Interface) on the display 35 (touch panel 36).

The ROM 32 stores various data to be processed by the CPU 31, such as various image data and metadata, and various programs such as applications. The RAM 33 is used as a work area of the CPU 31. At a time when a program such as an application is executed, various data necessary for the execution is read to the RAM 33.

Instead of the ROM 32 or in addition to the ROM 32, an HDD (Hard Disk Drive), a flash memory, or another non-volatile memory such as a solid-state memory may be used. In those storage devices, the various data and programs described above may be stored.

The speaker 34 reproduces a music content and outputs a voice guide or the like to the user 3. The display 35 is, for example, a display device that uses liquid crystal, EL (Electro-Luminescence), or the like, and displays the various GUIs or the like. As shown in FIG. 2, the display 35 is configured integrally with the touch panel 36, and those function as a display unit in this embodiment.

The IR communication unit 37 is a module for performing an IR communication with an external apparatus. The external interface 38 is, for example, an interface for achieving connection with the external interface on a basis of a standard such as a USB and an HDMI (registered trademark) (High-Definition Multimedia Interface).

The key/switch unit 39 receives an operation or the like by the user 3 which cannot be input through a touch panel 36, such as a power supply switch and a shortcut key, for example. The image pickup unit 40 includes a CMOS (Complementary Metal Oxide Semiconductor), a CCD (Charge Coupled Device) sensor, or the like and generates a digital image of a subject, for example.

The network module 41 is an interface for achieving connection to the home network 1, and a wireless LAN module such as WiFi is used, for example. The network module 41 is operated, with the result that it is possible to achieve wireless communication with the reproduction apparatuses 10 and the server apparatus 20.

The Bluetooth module 42 is a module for performing near field communication with each of the plurality of reproduction apparatuses 10 in compliant with the Bluetooth standard. In this embodiment, communication (BLE communication) compliant with a BLE (Bluetooth Low Energy) can be performed. Through the BLE communication, it is possible to control the operation of the reproduction apparatuses 10. It should be noted that for connection between apparatuses through the BLE communication (BLE connection), a form of performing pairing and a form of connecting without pairing can be achieved. Hereinafter, a BLE connection without pairing may be described as pairing-less connection or the like.

Further, the Bluetooth module 42 can receive a beacon signal compliant with a BLE standard. Information included in the received beacon signal is output to the CPU 31, and various processes are performed. Further, on a basis of an intensity (radio field intensity) of the beacon signal, it is possible to calculate a distance with an apparatus that outputs the beacon signal.

It should be noted that the Bluetooth module 42 may perform near field communication (BT communication) compliant with a Classic Bluetooth standard. In addition, the present technology can be applied to near field communication and a beacon signal which are compliant with an arbitrary standard.

The information processing by the mobile terminal 30 having the hardware structure as described above is achieved with software stored in the ROM 32 or the like and a hardware resource of the mobile terminal 30 cooperated with each other. For example, the CPU 31 loads a program (application) according to the present technology which is stored in the ROM 32 or the like to the RAM 33 and executes the program, thereby achieving an information processing method according to the present technology.

Further, the CPU 31 executes a predetermined program, with the result that blocks for performing steps of the information processing method according to the present technology including a connection unit, a calculation unit, a transmission unit, and the like according to the present technology. Of course, dedicated hardware for performing processes may be used as appropriate.

The program such as the application is installed into the mobile terminal 30 from a global network, for example. Alternatively, through a recording medium, the program may be installed into the mobile terminal 30.

[Network Setting of Reproduction Apparatus]

Figure 3:
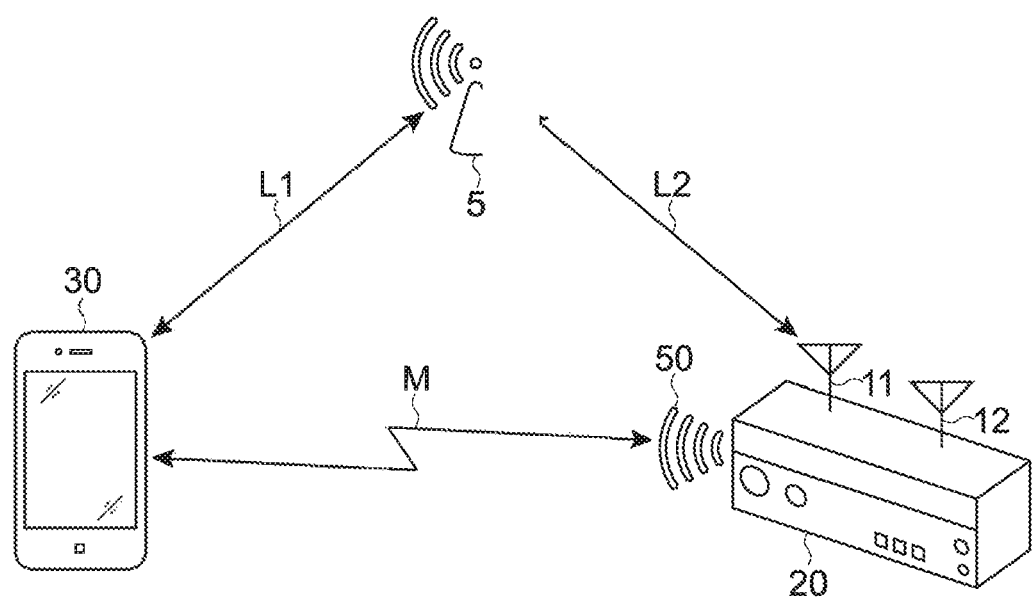
FIG. 3 A schematic diagram showing a connection form of a reproduction apparatus, an access point, and a mobile terminal.

A description will be given on network setting (also referred to as network initial setting) for connecting the reproduction apparatuses 10 to the home network 1 by using the mobile terminal 30. FIG. 3 is a diagram for explanation thereof and schematically shows a connection form of the reproduction apparatuses 10, the access point 5, and the mobile terminal 30. Network setting to be described below is an operation for establishing a wireless LAN connection (arrow L2) between the access point 5 and the reproduction apparatuses 10.

That is, in this embodiment, the reproduction apparatuses 10 capable of reproducing the content corresponds to a first apparatus. Further, the access point 5 that constructs the home network 1 as the wireless network corresponds to second apparatus.

The mobile terminal 30 is already subjected to the wireless LAN connection with the access point 5 (arrow L1). Thus, the network setting according to this embodiment is also processing for causing the reproduction apparatuses 10 to share connection setting to the access point 5 which is held by the mobile terminal 30.

In the reproduction apparatus 10, a network module 11 for performing the wireless LAN communication and a Bluetooth module 12 for performing the BLE communication are provided. In a case where the reproduction apparatus 10 is powered on (including both of an active state and a standby state), the Bluetooth module 12 periodically outputs a beacon signal 50.

The beacon signal 50 transmitted from the reproduction apparatus 10 includes apparatus information such as a model number of the reproduction apparatus 10, a unique ID such as a Bluetooth address, information relating to connection setting with another apparatus, and the like. The information relating to the connection setting corresponds to state information relating to connection with another apparatus and includes existence or nonexistence of the wireless LAN connection or the BLE connection, for example.

Figure 4:
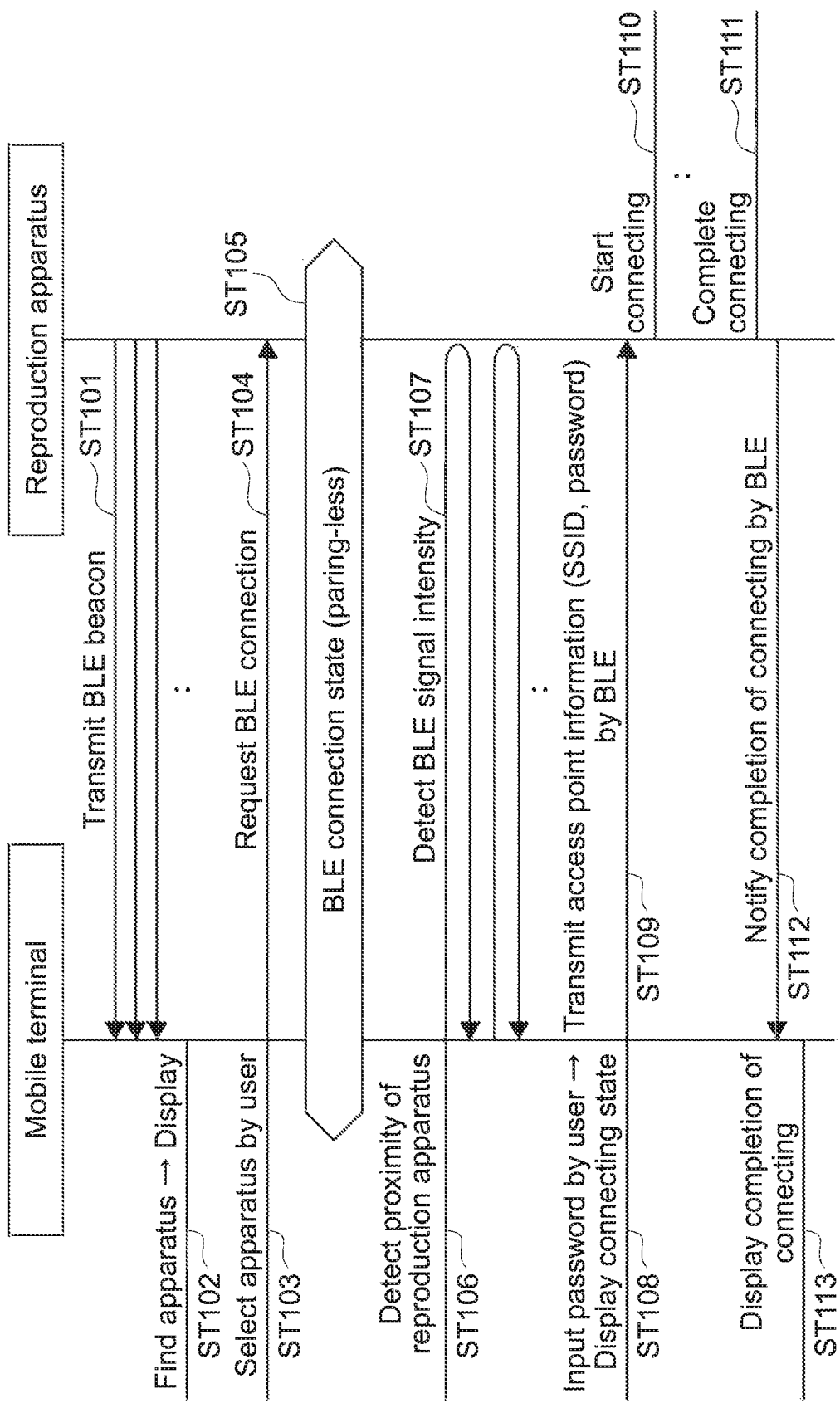
FIG. 4 A sequence diagram showing an operation example of network setting of the reproduction apparatus.

FIG. 4 is a sequence diagram showing an operation example of the network setting of the reproduction apparatus 10. FIGS. 5A, 5B, 5C, 6A, 6B, and 6C are diagrams each showing a configuration example of a GUI displayed on the touch panel 36 at a time of the network setting.

The reproduction apparatus 10 transmits the beacon signal 50 at predetermined intervals (Step 101). The predetermined intervals are not limited and are 700 ms to 10 s, for example. The mobile terminal 30 receives the beacon signal 50 and acquires apparatus information and the like included in the beacon signal 50. Thus, the mobile terminal 30 can detect the reproduction apparatus 10 on a basis of the beacon signal 50 (Step 102).

Figure 5C:
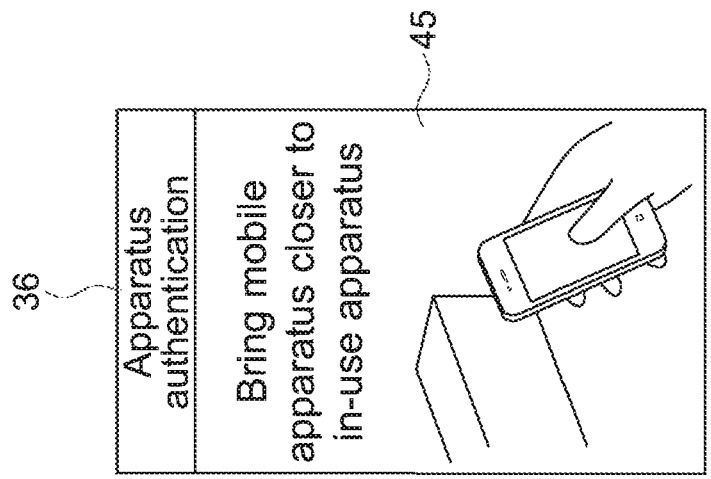
FIGS. 5A, 5B, and 5C Diagrams showing an example of a GUI displayed on a touch panel at a time of network setting.
Figure 5B:
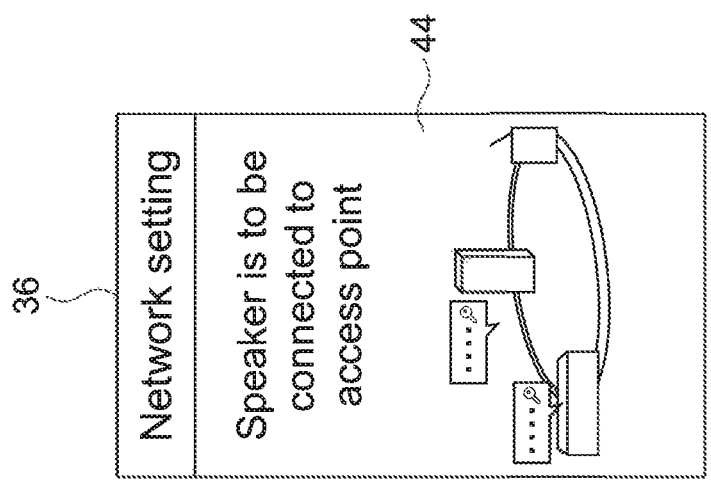
Figure 5A:
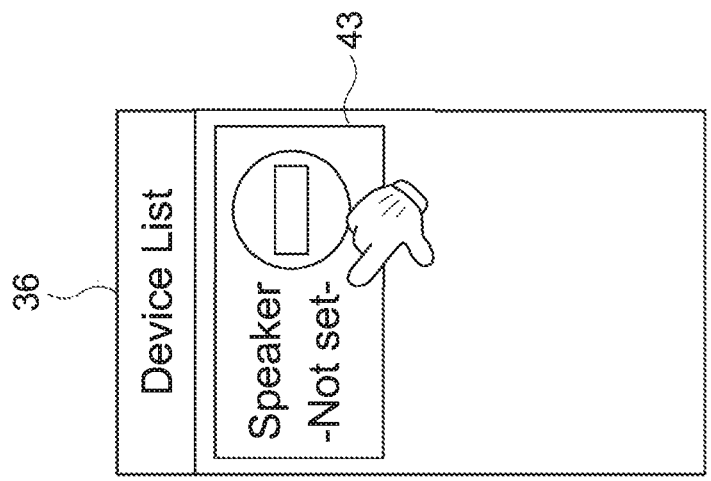

As shown in FIG. 5A, on the touch panel 36 of the mobile terminal 30, one or more detected information 43 relating to the reproduction apparatus 10 is displayed in a list (also Step 102). The information 43 relating to the reproduction apparatus 10 includes, for example, information relating to a name of a model of the reproduction apparatus 10, an icon, the connection setting, and the like. The information is not of course limited to this. In the example shown in FIG. 5A, one reproduction apparatus 10 which is not subjected to the connection setting with another apparatus is displayed.

The user 3 performs a selection operation with respect to the reproduction apparatus 10 displayed on the touch panel 36 (Step 103). In accordance with the selection operation, to the selected reproduction apparatus 10, a BLE connection request is transmitted from the mobile terminal 30 (Step 104). In response to the request, the mobile terminal 30 and the reproduction apparatus 10 are in a BLE connection state, and thus the BLE communication (arrow M of FIG. 3) is established (Step 105).

As described above, in this embodiment, the reproduction apparatus 10 detected on a basis of the beacon signal 50 is displayed on the touch panel 36 so as to be capable of being selected. As a result, the reproduction apparatus 10 that is desired to be connected with the access point 5 can be reliably selected. That is, it is possible to prevent a different reproduction apparatus 10 which is not intended by the user 3 from being erroneously connected with the access point 5. Thus, high security can be achieved.

Further, as information relating to the detected reproduction apparatus 10, information relating to the connection setting with a different apparatus is displayed. Therefore, the connection state of the reproduction apparatus 10 that is desired to be connected by the user 3 can be easily grasped. As a result, for example, it is possible to prevent a vain operation of trying to perform the network setting with respect to the reproduction apparatus 10 that is already connected with the access point 5. As a result, it is possible to exert high operability.

It should be noted that before the selection of the reproduction apparatus 10 in Step 103 or after that, a selection screen for selecting the access point 5 as a connection subject may be displayed. On the selection screen, for example, one or more connectable access points 5 are displayed in a list.

When the mobile terminal 30 and the reproduction apparatus 10 are in the BLE connection state, as shown in FIG. 5B, on the touch panel 36 of the mobile terminal 30, the network setting, that is, a GUI 44 indicating that the connection setting to the access point 5 is to be executed is displayed. A specific configuration of the GUI 44 is not limited, arbitrary text, image, and the like may be used. The same holds true for other GUIs shown in FIGS. 5A, 5B, 5C, 6A, 6B, and 6C.

It should be noted that, at a timing when the reproduction apparatus 10 shown in FIG. 5A is selected, the GUI 44 shown in FIG. 5B may be displayed. In this case, a GUI indicating that the BLE connection is being performed or a GUI indicating that the BLE connection is completed may be displayed.

It should be noted that as shown in Step 105 of FIG. 4, in this embodiment, the mobile terminal 30 and the reproduction apparatus 10 are connected in a pairing-less manner. As a result, for example, a complicated operation including a pass key authentication and the like necessary for Bluetooth pairing in related art becomes unnecessary, and thus the apparatuses can be easily connected. As a result, it is possible to easily perform the network setting of the reproduction apparatus 10.

Subsequently, proximity authentication using the BLE communication is performed. To achieve this, proximity of the reproduction apparatus 10 relative to the mobile terminal 30 is detected (Step 106). Specifically, on a basis of an intensity of a BLE signal received from the reproduction apparatus 10 through the BLE communication, a distance from the mobile terminal 30 to the reproduction apparatus 10 is calculated. In a case where the calculated distance is equal to or less than a predetermined threshold value, the authentication is successful.

As shown in FIG. 5C, on the touch panel 36 of the mobile terminal 30, a GUI 45 indicating that the mobile terminal 30 is prompted to be brought closer to the reproduction apparatus 10 is displayed. The GUI 45 corresponds to guide information for guiding the user of the mobile terminal 30 in such a manner that the distance from the mobile terminal 30 to the reproduction apparatus 10 is equal to or less than the threshold value. The guide information output from the mobile terminal 30 is not limited.

For example, as the guide information, information based on a distance to the reproduction apparatus 10 may be displayed. For example, a current distance, a degree of a distance to a threshold value, a specific distance to a threshold value (difference between the current distance and the threshold value), or the like may be displayed.

For example, when an assumption is made that a threshold value to make the proximity authentication successful is set within 1 m, "bring mobile terminal closer within 1 m", "get a little closer within 1 m", "3 m distanced now, move forward by 2 m or more", or the like may be displayed. It should be noted that the guide information may be output from the speaker 34 by voice. As described above, by outputting the various guide information, it is possible to easily perform the connection setting to the access point 5.

As shown in Step 107 of FIG. 4, in this embodiment, from the mobile terminal 30, an inquiry signal is transmitted to the reproduction apparatus 10, and a distance is calculated on a basis of an intensity of a response signal to the inquiry signal. The inquiry signal is a signal for inquiring an intensity of the BLE signal transmitted from the reproduction apparatus 10. An arbitrary signal capable of receiving the response signal from the reproduction apparatus 10 may be transmitted. The inquiry signal is transmitted at an interval of approximately 500 ms, for example, and at the same interval, the distance to the reproduction apparatus 10 is periodically calculated.

On a basis of an intensity of the beacon signal 50 periodically transmitted from the reproduction apparatus 10, the distance to the reproduction apparatus 10 may be calculated. As a result, it is possible to easily calculate the distance to the reproduction apparatus 10 without generating and transmitting the inquiry signal.

On the other hand, in a case where the inquiry signal is transmitted, it is possible to set timing when the distance is calculated and the interval at which the distance is calculated on the mobile terminal 30 side. For example, in a case where an interval of the transmission of the beacon signal 50 by the reproduction apparatus 10 is relatively large, the interval at which the distance is calculated is also increased. Thus, even if the user 3 brings the mobile terminal 30 closer within the distance of the threshold value, authentication may not be successful immediately. As a result, a reduction in authentication accuracy, a degradation of operability, and the like may be caused.

In contrast, the timing when the distance is calculated and the interval at which the distance is calculated are set as appropriate on the mobile terminal 30 side, with the result that high accuracy of the proximity authentication can be maintained. Further, the operability by the user 3 can be improved. It should be noted that the threshold value at which the proximity authentication is successful is not limited and may be set as appropriate.

Figure 6C:
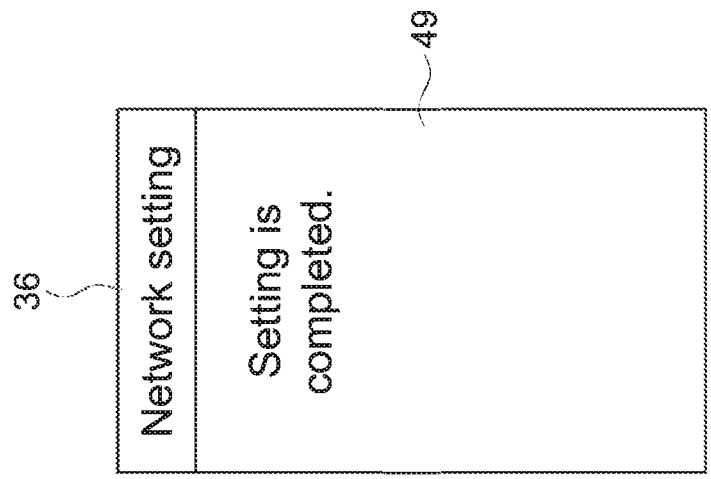
FIGS. 6A, 6B, and 6C Diagrams showing an example of a GUI displayed on a touch panel at a time of network setting.
Figure 6B:
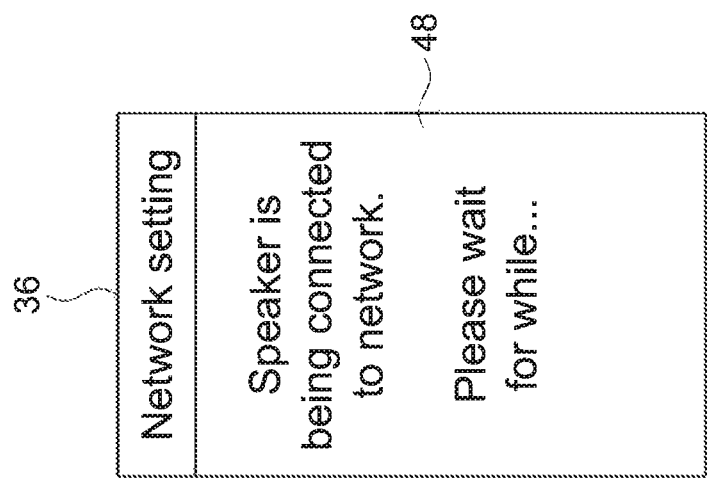
Figure 6A:
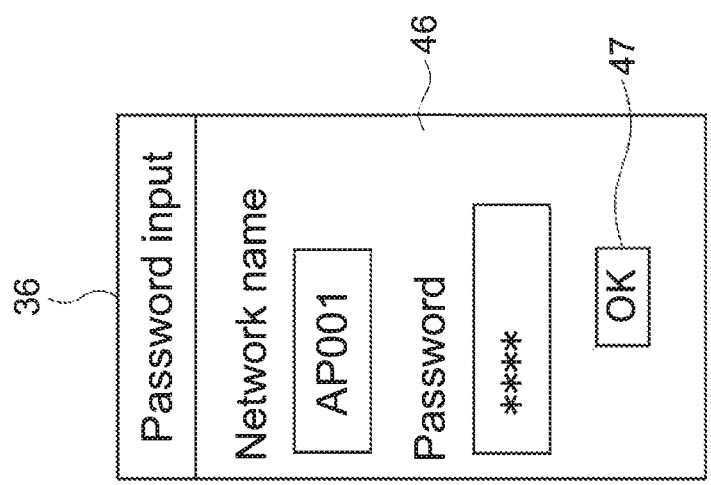

In a case where the distance from the mobile terminal 30 to the reproduction apparatus 10 is equal to or less than the threshold value, and the proximity authentication is successful, as shown in FIG. 6A, an input screen 46 for inputting setting information relating to the network setting is displayed. Information input as the setting information is an SSID (Service Set Identifier) for identifying the access point 5 and a password. As described above, in this embodiment, the mobile terminal 30 and the access point 5 are already connected through the wireless LAN communication. Thus, the SSID may be automatically input.

When the user inputs the setting information and selects an OK button 47, as shown in FIG. 6B, a GUI 48 indicating that the state is being connected is displayed (Step 108). Then, through the BLE communication, from the mobile terminal 30 to the reproduction apparatus 10, the setting information including the SSID and the password is transmitted (Step 109). It should be noted that the access point information shown in FIG. 4 corresponds to the setting information.

On a basis of the setting information transmitted from the mobile terminal 30, the reproduction apparatus 10 starts connecting to the wireless LAN connection, that is, the access point 5 (Step 110). Upon completion of the connection to the access point 5 by the reproduction apparatus 10 (Step 111), through the BLE communication, a completion notification of the connection is transmitted to the mobile terminal 30 (Step 112).

The mobile terminal 30 that has received the completion notification causes a GUI 49 indicating that the network setting is completed to be displayed on the touch panel 36 as shown in FIG. 6C (Step 113). As a result, the fact that the network setting of the reproduction apparatus 10 is completed is fed back to the user 3.

It should be noted that in a case where the connection between the reproduction apparatus 10 and the access point 5 is failed, an error notification indicating the fact is displayed on the mobile terminal 30. On the touch panel 36 of the mobile terminal 30, for example, error information indicating that the connection is failed is displayed, and inputting the setting information again is prompted.

As described above, according to this embodiment, in the content reproduction system 100, on a basis of the beacon signal 50 transmitted from the reproduction apparatus 10, the mobile terminal 30 and the reproduction apparatus 10 are connected in such a manner that the mobile terminal 30 and the reproduction apparatus 10 can be communicated with each other. Thus, it is possible to easily achieve the connection between the mobile terminal 30 and the reproduction apparatus 10. Further, in a case where the distance from the mobile terminal 30 to the reproduction apparatus 10 is equal to or less than the predetermined threshold value, the setting information for connection with the access point 5 is transmitted to the reproduction apparatus 10. As a result, it is possible enhance security.

To connect the reproduction apparatus 10 to the access point 5, a method of establishing the wireless LAN communication between the reproduction apparatus 10 and the mobile terminal 30 or performing Bluetooth pairing can be considered. On the mobile terminal 30, the access point 5 is selected, and installation information is input. The information is transmitted, through the wireless LAN communication or the BT communication, to the reproduction apparatus 10. As a result, the network setting of the reproduction apparatus 10 is achieved.

However, this method requires an operation on the reproduction apparatus 10 side, that is, an operation of setting the reproduction apparatus 10 to an access point mode or a pairing mode. Further, on the mobile terminal 30, the method requires an operation for switching the wireless LAN connection from the access point 5 to the reproduction apparatus 10 or an operation for performing the Bluetooth pairing. That is, the user 3 has to perform a complicated operation, so the operability of the network setting is poor. As a result, it is just conceivable that the user 3 hesitate over the operation, and the network setting cannot be achieved.

In contrast, in this embodiment, when the reproduction apparatus 10 is in an ON state, it is possible to easily detect the reproduction apparatus 10 by using a BLE beacon, even if network initial setting is not carried out. Further, the BLE connection with the detected reproduction apparatus 10 is easily achieved. That is, it is unnecessary to prepare a special infrastructure for finding an apparatus or the like, which can cut an unnecessary cost.

On the other hand, in the pairing-less BLE connection described above, there is a possibility that an apparatus that is not intended by the user 3 and the mobile terminal 30 may be connected. Thus, at a time when setting information of the network is transmitted, the setting information may be transmitted to the unintended apparatus.

In view of this, in this embodiment, proximity authentication that uses the BLE communication is performed. As a result, to the reproduction apparatus 10 desired by the user 3, that is, only to the reproduction apparatus 10 in front of user's eyes, the setting information can be transmitted. As a result, it is possible to prevent an erroneous transmission of the setting information to a different apparatus and an action to try to obtain the setting information by using another apparatus in an unauthorized manner from occurring. Thus, significantly high security is achieved. That is, the connection to the access point 5 can be performed simply and safely.

It should be noted that, as the proximity authentication, a method of using NFC (Near Field Communication) may also be used. However, there are problems in that the NFC has a low publicity, and visibility of an NFC device position (position of an NFC mark) is low, for example. For example, a case where the user 3 may hesitate about where the user causes the mobile terminal 30 to be touched, a case where a touching operation may be difficult to be detected, which causes a stress, or the like may occur.

In contrast, in this embodiment, it is possible to perform the proximity detection in which a distance of within 1 m is set. Thus, the user 3 only has to perform a general operation of making an approach within a distance of a certain degree, so the proximity authentication can be easily performed. Further, it is unnecessary for the user 3 to recognize a difficult technique. That is, according to the information processing method of the present technology, it is possible to improve the operability of the network setting while maintaining a high security.

<Other Embodiments>

The present technology is not limited to the embodiment described above and can achieve various other embodiments.

Figure 7:
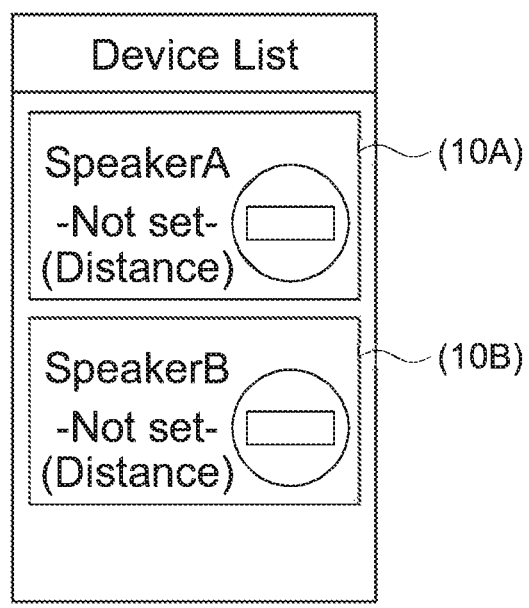

FIG. 7 is a diagram showing another configuration example of a device list that displays the reproduction apparatus detected on a basis of the beacon signal. In an example shown in FIG. 7B, two reproduction apparatuses 10A and 10B are displayed. Further, as information relating to the reproduction apparatuses, a distance from the mobile terminal to each of the reproduction apparatuses is displayed. As a result, a user can intuitively grasp which actual apparatus the reproduction apparatus displayed on the device list corresponds to on a basis of a distance from the user. As the device list, it is effective that reproduction apparatuses are displayed in ascending order of distance in the list.

As the reproduction apparatus that is an apparatus to be connected the access point, the plurality of reproduction apparatuses 10A and 10B can be selected. In this case, in a case where the distance to the mobile terminal is equal to or less than the threshold value, the proximity authentication is successful, and to each of the reproduction apparatuses 10A and 10B, the SSID and password are transmitted. Of course, three or more reproduction apparatuses may be selected at the same time.

For example, to the reproduction apparatuses 10A and 10B, the mobile terminal is brought to be closer in order, and the proximity authentication is performed for the reproduction apparatuses in order. Then, the setting information is transmitted to the reproduction apparatuses for which the proximity authentication is successful in order of success. Alternatively, in a case where the mobile terminal is moved to a position within the threshold value from the reproduction apparatus 10A and within the threshold value from the reproduction apparatus 10B, the proximity authentication may be successful, and the setting information may be transmitted to both the reproduction apparatuses 10A and 10B.

From a touch panel or a speaker of the mobile terminal, for example, such guide information that "first, bring the mobile terminal closer to the reproduction apparatus 10A. After that, bring the mobile terminal closer to the reproduction apparatus 10B" is output. Alternatively, such guide information that "bring the mobile terminal closer within 1 m to both the apparatuses at the same time" is output. As a result, operability of the user is improved, and the network setting can be easily performed.

By the present technology, Bluetooth pairing of the mobile terminal and the reproduction apparatus can be performed. For example, in a case where the proximity authentication using the BLE communication is successful, through the BLE communication, setting information including a request of pairing and a Bluetooth address is transmitted from the mobile terminal to the reproduction apparatus. The reproduction apparatus performs pairing with respect to the received Bluetooth address. As a result, it is possible to establish the Bluetooth pairing simply and safely without setting the reproduction apparatus to the pairing mode. Further, the present technology can be applied to handover of the Bluetooth. It should be noted that in this case, the mobile terminal corresponds to a second apparatus.

In the above description, as the first apparatus according to the present technology, the reproduction apparatus capable of reproducing the content is exemplified. However, the first apparatus is not limited to this, an arbitrary network-enabled apparatus can be applied as the first apparatus.

The present technology can also be applied to changing of the access point as a connection destination. In this case, the device list shown in FIG. 5A or the like indicates information relating to the access point of the connection destination as information of connection setting. The user inputs an operation for changing the access point and selects the access point as a new connection destination. After that, in a case where the proximity authentication using the BLE communication is successful, an SSID and a password of the new access point are transmitted to the reproduction apparatus. As a result, the access point can be changed simply and safely.

In the above description, the access point that is connected to the mobile terminal through the wireless LAN communication is selected as the access point of the connection destination but is not limited to this. It is also possible to perform the connection setting for the access point to which the mobile terminal is not connected. In this case, on the touch panel of the mobile terminal, as a selection screen of the access point, connectable access points are displayed in a list.

As the paring (apparatus registration) between a visual apparatus such as a television set and a mobile apparatus, there is a method of performing the paring by causing both the apparatuses to display the same passcode and causing a user to confirm that the passcode is the same. Instead of this method, for example, with a use of the proximity authentication using the BLE described above, it is possible to omit authentication with the passcode. As a result, it is possible to improve the operability of the user.

The beacon signal transmitted from the first apparatus may include a request of connection that allows communication. Then, in accordance with a selection operation for the first apparatus by the user, a reply is made to the request of connection, and thus the connection that allows the communication between a computer used by the user and the first apparatus may be established.

In the above description, the near field communication and the beacon signal which are compliant with the BLE standard are exemplified. The communication standard for carrying out the present technology is not limited. Further, in the above description, the BLE communication by the pairing-less is established. However, to transmit the setting information such as the SSID, the mobile terminal and the reproduction apparatus may be subjected to the pairing.

It is also possible to combine at least two characteristic parts out of the characteristic parts according to the present technology described above. That is, the various characteristic parts described in the above embodiments may be arbitrarily combined regardless of the embodiments. Further, the various effects described above are merely examples and are not limited to those. Further, other effects may be exerted.

It should be noted that the present technology can take the following configurations.

(1) An information processing method executed by a computer, including:
 detecting, on a basis of a beacon signal transmitted from a first apparatus, the first apparatus, and communicably connecting the detected first apparatus and the computer;
 calculating a distance from the computer to the first apparatus on a basis of an intensity of a signal received from the first apparatus communicably connected; and
 transmitting, in a case where the calculated distance is equal to or less than a predetermined threshold value, setting information for communicably connecting the first apparatus and a second apparatus to the first apparatus.

(2) The information processing method according to (1), in which
 the calculating step includes transmitting a predetermined inquiry signal to the first apparatus and calculating the distance on a basis of an intensity of a response signal to the inquiry signal from the first apparatus.

(3) The information processing method according to (1) or (2), in which
 the calculating step includes calculating the distance on a basis of an intensity of the beacon signal received from the first apparatus.

(4) The information processing method according to any one of (1) to (3), further including:
 outputting guide information for guiding a user of the computer in such a manner that the distance from the computer to the first apparatus is equal to or less than the threshold value.

(5) The information processing method according to any one of (1) to (4), further including:
 displaying the first apparatus detected on a basis of the beacon signal on a display unit of the computer, in which
 the connecting step includes connecting, in accordance with a selection operation by a user with respect to the first apparatus displayed on the display unit, the selected first apparatus and the computer.

(6) The information processing method according to (5), in which
 the displaying step includes displaying state information relating to connection of the detected first apparatus with the second apparatus.

(7) The information processing method according to (5) or (6), in which
 the displaying step includes displaying the distance from the computer to the detected first apparatus on the display unit.

(8) The information processing method according to any one of (1) to (7), in which
 the connecting step includes connecting, on a basis of the beacon signal compliant with a BLE (Bluetooth Low Energy) standard, the first apparatus and the computer in such a manner that BLE communication is enabled, and
 the transmitting step includes transmitting the setting information through the BLE communication.

(9) The information processing method according to any one of (1) to (8), in which
 the second apparatus is an access point that constructs a wireless network, and
 the transmitting step includes transmitting the setting information including an SSID (Service Set Identifier) for identifying the access point and a password.

(10) The information processing method according to any one of (1) to (9), in which
 the second apparatus is the computer, and
 the transmitting step includes transmitting the setting information including a Bluetooth (registered trademark) address and a pairing request.

(11) The information processing method according to any one of (1) to (10), in which
 the first apparatus is a reproduction apparatus capable of reproducing a content,
 the information processing method further including:
 transmitting an instruction to perform content reproduction to the reproduction apparatus via the wireless network.

(12) The information processing method according to any one of (1) to (11), in which
 the connecting step includes detecting a plurality of first apparatuses, and connecting each of the plurality of detected first apparatuses and the computer, and
 the transmitting step includes transmitting the setting information to each of the plurality of first apparatuses communicably connected, in a case where a distance to the computer is equal to or less than the threshold value.

REFERENCE SIGNS LIST

1 . . . home network
3 . . . user
5 . . . access point
10 . . . reproduction apparatus
30 . . . mobile terminal
35 . . . display
36 . . . touch panel
11, 41 . . . network module
12, 42 . . . Bluetooth module
43 . . . information relating to reproduction apparatus
45 . . . GUI indicating that mobile terminal is prompted to bring closer
46 . . . input screen of setting information 50 . . . beacon signal
100 . . . content reproduction system

The invention claimed is:

1. An information processing method, comprising:
in a terminal device that comprises circuitry:
receiving a beacon signal from a first apparatus;
detecting the first apparatus based on the beacon signal received from the first apparatus,
wherein the beacon signal includes information regarding a model number of the first apparatus;
displaying, on a display screen of the terminal device, the information regarding the model number of the first apparatus;
connecting the first apparatus and the terminal device based on the displayed information;
periodically transmitting an inquiry signal to the first apparatus at a first interval;
periodically calculating, at a second interval, a distance from the terminal device to the first apparatus based on an intensity of a response signal, wherein
the second interval at which the distance is calculated is based on the first interval, and
the response signal is received from the first apparatus based on the transmitted inquiry signal;
displaying, on the display screen of the terminal device, guide information based on the calculated distance, wherein the guide information indicates a difference between a threshold value and the calculated distance; and
transmitting, based on the calculated distance that is equal to or less than the threshold value, setting information to the first apparatus through the connection between the first apparatus and the terminal device,
wherein the first apparatus is connected to a second apparatus based on the setting information.

2. The information processing method according to claim 1, further comprising:
displaying, on the display screen of the terminal device, the first apparatus; and
connecting, based on a user selection operation on the display screen, the first apparatus and the terminal device,
wherein the user selection operation includes selection of the displayed first apparatus.

3. The information processing method according to claim 2, further comprising displaying state information associated with the connection of the first apparatus with the second apparatus.

4. The information processing method according to claim 2, further comprising displaying the calculated distance on the display screen.

5. The information processing method according to claim 1, further comprising:
connecting, based on the beacon signal compliant with a BLE (Bluetooth Low Energy) standard, the first apparatus and the terminal device for enabling a BLE communication; and
transmitting the setting information to the first apparatus through the BLE communication.

6. The information processing method according to claim 1, wherein
the second apparatus is an access point that constructs a wireless network, and
the setting information includes a service set identifier (SSID) associated with the access point, and a password associated with the access point.

7. The information processing method according to claim 1, wherein
the second apparatus corresponds to the terminal device, and
the setting information includes a Bluetooth (registered trademark) address and a pairing request.

8. The information processing method according to claim 1, further comprising transmitting an instruction for content reproduction to a reproduction apparatus, via a wireless network,
wherein the first apparatus is the reproduction apparatus.

9. The information processing method according to claim 1, further comprising:
detecting a plurality of first apparatuses;
connecting each first apparatus of the plurality of first apparatuses with the terminal device based on the detection of the plurality of first apparatuses; and
transmitting the setting information to each first apparatus of the plurality of first apparatuses based on a respective distance between each first apparatus of the plurality of first apparatuses and the terminal device,
wherein the respective distance is equal to or less than the threshold value.

10. A non-transitory computer-readable medium having stored thereon computer-executable instructions which, when executed by a processor, cause the processor to execute operations, the operations comprising:
receiving a beacon signal from a first apparatus;
detecting the first apparatus based on the beacon signal received from the first apparatus,
wherein the beacon signal includes information regarding a model number of the first apparatus;
displaying, on a display screen of a terminal device, the information regarding the model number of the first apparatus;
connecting the first apparatus and the terminal device based on the displayed information;
periodically transmitting an inquiry signal to the first apparatus at a first interval;
periodically calculating, at a second interval, a distance from the terminal device to the first apparatus based on an intensity of a response signal, wherein
the second interval at which the distance is calculated is based on the first interval, and
the response signal is received from the first apparatus based on the transmitted inquiry signal;
displaying, on the display screen of the terminal device, guide information based on the calculated distance, wherein the guide information indicates a difference between a threshold value and the calculated distance; and
transmitting, based on the calculated distance that is equal to or less than the threshold value, setting information to the first apparatus through the connection between the first apparatus and the terminal device,
wherein the first apparatus is connected to a second apparatus based on the setting information.

11. An information processing system, comprising:
a first apparatus configured to output a beacon signal;
a second apparatus; and
a terminal device that includes circuitry configured to:
detect the first apparatus based on the beacon signal outputted from the first apparatus,
wherein the beacon signal includes information regarding a model number of the first apparatus;

display, on a display screen of the terminal device, the information regarding the model number of the first apparatus;

connect the terminal device with the first apparatus based on the displayed information;

periodically transmit an inquiry signal to the first apparatus at a first interval;

periodically calculate, at a second interval, a distance from the terminal device to the first apparatus based on an intensity of a response signal, wherein
 the second interval at which the distance is calculated is based on the first interval, and
 the response signal is received from the first apparatus based on the transmitted inquiry signal;

display, on the display screen of the terminal device, guide information based on the calculated distance, wherein the guide information indicates a difference between a threshold value and the calculated distance; and transmit, based on the calculated distance that is equal to or less than the threshold value, setting information to the first apparatus through the connection between the first apparatus and the terminal device, wherein the first apparatus is connected to the second apparatus based on the setting information.

* * * * *